(12) United States Patent
Lorigo et al.

(10) Patent No.: US 6,718,054 B1
(45) Date of Patent: Apr. 6, 2004

(54) MRA SEGMENTATION USING ACTIVE CONTOUR MODELS

(75) Inventors: Liana M. Lorigo, Cambridge, MA (US); W. Eric L. Grimson, Lexington, MA (US); Olivier Faugeras, Valbonne (FR); Renaud Keriven, Joinville (FR); Carl-Fredrik Westin, Cambridge, MA (US); Ron Kikinis, Brookline, MA (US)

(73) Assignees: Massachusetts Institute of Technology, Cambridge, MA (US); The Brigham and Women's Hospital, Inc., Boston, MA (US); Institute National de Recherche en Informatique et en Automatique, Lechesnay (FR)

( * ) Notice: Subject to any disclaimer, the term of this patent is extended or adjusted under 35 U.S.C. 154(b) by 435 days.

(21) Appl. No.: 09/602,701

(22) Filed: Jun. 23, 2000

Related U.S. Application Data

(60) Provisional application No. 60/140,609, filed on Jun. 23, 1999.

(51) Int. Cl.[7] .................................................. G06K 9/00
(52) U.S. Cl. ........................................................ 382/128
(58) Field of Search ......................................... 382/128

(56) References Cited

U.S. PATENT DOCUMENTS

| | | | |
|---|---|---|---|
| 4,875,165 A | 10/1989 | Fencil et al. ............ 364/413.22 |
| 5,297,550 A | 3/1994 | Margosian ............... 128/653.2 |
| 5,368,033 A | 11/1994 | Moshfeghi ............... 128/653.4 |
| 5,644,646 A | 7/1997 | Du et al. .................... 382/128 |
| 5,647,360 A | 7/1997 | Bani-Hashemi et al. . 128/653.1 |
| 5,690,106 A | 11/1997 | Bani-Hashemi et al. . 128/653.1 |
| 5,699,799 A | 12/1997 | Xu et al. .................. 128/653.1 |
| 5,832,134 A | 11/1998 | Avinash et al. ............. 382/257 |
| 5,848,121 A | 12/1998 | Gupta et al. ................. 348/62 |
| 5,920,319 A | 7/1999 | Vining et al. ................ 345/420 |
| 5,923,770 A * | 7/1999 | O'Donnell et al. ......... 382/131 |
| 6,047,080 A * | 4/2000 | Chen et al. ................. 382/128 |
| 6,058,218 A | 5/2000 | Cline ......................... 382/254 |
| 6,345,112 B1 * | 2/2002 | Summers et al. ........... 382/128 |
| 6,535,623 B1 * | 3/2003 | Tannenbaum et al. ...... 382/128 |

OTHER PUBLICATIONS

Front propagation and level–set approach for geodesic active stereovision, Deriche, R.; Bouvin, C.; Faugeras, O.; Visual Surveillance, 1998. Proceedings., 1998 IEEE Workshop on, Jan 2, 1998 pp.: 56–63.*

(List continued on next page.)

Primary Examiner—Leo Boudreau
Assistant Examiner—Hussein Akhavannik
(74) Attorney, Agent, or Firm—Gauthier & Connors LLP

(57) ABSTRACT

A method and system of providing segmentation of volumetric three-dimensional image data set such as MRA images. Initially, a three-dimensional MRA volume is input. An initial surface S is then generated by thresholding the input. A signed distance function v to S is then generated, where $v=v(x,t)$ and S is the zero level set of $v(\cdot,0)$. The process proceeds by iteratively updating v according to $$v_t = \lambda(\nabla v(x,t), \nabla^2 v(x,t)) + \frac{g'}{g}\nabla v(x,t) \cdot H \frac{\nabla I}{|\nabla I|},$$

the updating terminates at convergence or as determined by an operator. S' is then defined to be the zero level set of the current distance function v' and reinitialize v' to be a distance function to S'. The volume is continually iteratively updated such that a final distance function v is obtained. The first output obtained from this volume is a segmentation of vessels in the MRA data, obtained by computing the zero level set of v.

14 Claims, 9 Drawing Sheets

OTHER PUBLICATIONS

Variational principles, surface evolution, PDEs, level set methods, and the stereo problem, Faugeras, O.; Keriven, R.; Image Processing, IEEE Transactions on, vol.: 7 Issue: 3, Mar. 1998 pp.: 336–344.*

Verdock B. et al., "Accurate Segmentation of Blood Vessels From 3D Medical Images"; Proceedings of the International Conference On Image Processing; (ICIP), US, New York, IEEE, Sep. 16, 1996 p. 312.

Kim D. K. et al., Boundary Segmentation and Model Fitting Using Affine Active Surfacemodel: Digital Signal Processing Application, US, New York; IEEE, Nov. 26, 1996; pp. 147–150.

Snell J.W. et al., "Model–Based Segmentation of the Brain From 3–D MRI Using Active Surfaces"; Proceedings of the Northeast Bioengineering Conference, US, New York, IEEE, Vol, Conf. 19, Mar. 18, 1993; pp. 164–165.

* cited by examiner

MRA SEGMENTATION USING ACTIVE CONTOUR MODELS

PRIORITY INFORMATION

This application claims priority from provisional application Ser. No. 60/140,609 filed Jun. 23, 1999 and incorporated herein by reference in its entirety.

This invention was made with government support under Grant No. IIS-9610249 awarded by the National Science Foundation. The government has certain rights in the invention.

BACKGROUND OF THE INVENTION

The invention relates to the field of volumetric three-dimensional image data segmentation, and in particular to MRA segmentation.

Automatic and semi-automatic magnetic resonance angiography (MRA) segmentation techniques can potentially save radiologists large amounts of time required for manual segmentation and can facilitate further data analysis. It is desirable to develop computer vision techniques for the segmentation of medical images. Specifically, the segmentation of volumetric vasculature images is considered, such as the magnetic resonance angiography (MRA) image pictured in FIG. 1.

As shown in FIG. 1, blood vessels appear in MRA images as bright curve-like patterns which may be noisy and have gaps. What is shown is a "maximum intensity projection". The data is a stack of slices where most areas are dark, but vessels tend to be bright. This stack is collapsed into a single image for viewing by performing a projection through the stack that assigns to each pixel in the projection the brightest voxel over all slices. This image shows projections along three orthogonal axes.

Thresholding is one possible approach to this segmentation problem and works adequately on the larger vessels. The problem arises in detecting the small vessels. Thresholding cannot be used for the small vessels for several reasons. The voxels may have an intensity that is a combination of the intensities of vessels and background if the vessel is only partially inside the voxel. This sampling artifact is called partial voluming. Other imaging conditions can cause some background areas to be as bright as other vessel areas, complicating threshold selection. Finally, the images are often noisy, and methods using local contextual information can be more robust.

Mean curvature evolution schemes for segmentation, implemented with level set methods, have become an important approach in computer vision. This approach uses partial differential equations to control the evolution. The fundamental concepts from mathematics from which mean curvature schemes derive were explored several years earlier when smooth closed curves in 2D were proven to shrink to a point under mean curvature motion. Mean curvature flow of any hypersurface was framed as a level set problem. For application to image segmentation, a vector field was induced on the embedding space, so that the evolution could be controlled by an image gradient field or other image data. The same results of existence, uniqueness, and stability of viscosity solutions were obtained for the modified evolution equations for the case of planar curves, and experiments on real-world images demonstrated the effectiveness of the approach.

Curves evolving in the plane became surfaces evolving in space, called "minimal surfaces". Although the theorem on planar curves shrinking to a point could not be extended to the case of surfaces evolving in 3D, the existence, uniqueness, and stability results of the level set formalism held analogously to the 2D case. Thus, the method was feasible for evolving both curves in 2D and surfaces in 3D. Beyond elegant mathematics, spectacular results on real-world data sets established the method as an important segmentation tool in both domains. One fundamental limitation to these schemes has been that they describe only the flow of hypersurfaces, i.e., surfaces of co-dimension 1.

The problem of curve-shortening flow for 3D curves has been studied, and the level set technique has been generalized to arbitrary manifolds in arbitrary dimension. Analogous results were provided and extend the level set evolution equation to account for an additional vector field induced on the space.

SUMMARY OF THE INVENTION

Accordingly, the invention presents the first implementation of geodesic active contours in 3D. Specifically, the system and method of the invention use these techniques for automatic segmentation of blood vessels in MRA images. The dimension of the manifold is 1, and its co-dimension is 2.

The invention utilizes the fact that the underlying structures in the image are indeed 3D curves and evolves an initial curve into the curves in the data (the vessels). In particular, the segmentation techniques of the invention are based on the concept of mean curvature flow, or curve-shortening flow, from the field of differential geometry. The proposed MRA segmentation method uses a mathematical modeling technique that is well-suited to the complicated curve-like structure of blood vessels. The segmentation task is defined as an energy minimization over all 3D curves and uses a level set method to search for a solution. The approach is an extension of previous level set segmentation techniques to higher co-dimension.

The invention thus sets forth a method of providing segmentation of volumetric three-dimensional image data such as MRA images. Initially, a three-dimensional MRA volume is provided. An initial surface S is then generated by thresholding input. A signed distance function v to S is then generated, where $v=v(x,t)$ and S is the zero level set of $v(\cdot,0)$. The process proceeds by iteratively updating v according to $$v_t = \lambda(\nabla v(x, t), \nabla^2 v(x, t)) + \frac{g'}{g} \nabla v(x, t) \cdot H \frac{\nabla I}{|\nabla I|},$$

the updating terminates at convergence or as determined by an operator. S' is then defined to be the zero level set of the current distance function v' and reinitialize v' to be a distance function to S'. The volume is continually iteratively updated such that a final distance function v is obtained. The first output obtained from this volume is a segmentation of vessels in the MRA data, obtained by computing the zero level set of v.

DETAILED DESCRIPTION OF THE INVENTION

Intuitively, mean curvature flow refers to some curve evolving in time so that at each point, the velocity vector normal to the curve is equal to the mean curvature vector. This concept is normally defined for arbitrary generic surfaces, but only curves are necessary for the invention, so the definition has been restricted for purposes of illustration.

More formally, let $C_t$, $t \geq 0$ be a family of curves in $R^2$ or $R^3$, N the normal for a given orientation. That is, C is a curve, and t represents the time parameter or the index into the family of curves, not position. The mean curvature flow equation is then given by the vector equation $$C_t = \kappa N \quad (1)$$

with given initial curve $C(0)=C_0$, $\kappa$ the curvature of the curve, and $C_t$ the time derivative of the curve. It will be appreciated that only 1D curves are considered here, as opposed to evolving surfaces, the mean curvature is just the usual curvature of the curve. This motion is also called "curve-shortening flow" since it is the solution, obtained by Euler-Lagrange equations, to the problem of minimizing curve length:

$${}_C{}^{min}\int |C'(p)|dp$$

where p is the spatial parameter of the curve.

The basic idea of the level set method is given to evolve a planar curve C. Define a function u: $R^2 \to R$ so that C is a level-set of u. The convention that C is, in particular, the zero level set of u, although this choice is not necessary for the method. The function u is now an implicit representation of the curve C. The advantages of this representation are that it is intrinsic (independent of parameterization) and that it is topologically flexible since different topologies of C are represented by the constant topology of u. Let $C_0$ be the initial curve.

Evolving C according to $$C_t = \beta N \quad (2)$$

with initial condition $C(\cdot,0)=C_0(\cdot)$ for any function $\beta$, is equivalent to evolving u according to $$u_t = \beta|\nabla u| \quad (3)$$

with initial condition $u(\cdot,0)=u_0(\cdot)$ and $u_0(C_0)=0$.

Figure 2:
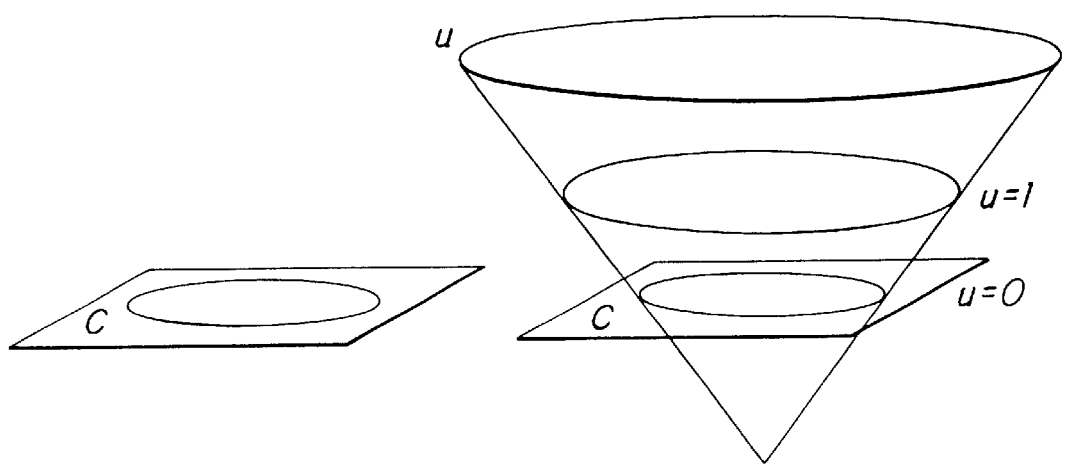
FIG. 2 illustrates level sets of an embedding function u, for a closed curve in $R^2$.

This result is independent of the choice of function u. As is customary in the literature, u to be the signed distance function to the curve C as shown in FIG. 2. FIG. 2 illustrates level sets of an embedding function u, for a closed curve in $R^2$.

The level set evolution equations that follow enable one to evolve space curves, with evolution driven by both mean curvature and image information. In the following discussion, C is a curve in 3D.

Let $v:R^3 \to [0,\infty)$ be an auxiliary function whose zero level set is identically C, that is smooth near C, and such that $\nabla v$ is non-zero outside C. For a nonzero vector $q \in R^n$, define $$P_q = I - \frac{qq^T}{|q|^2}$$

as the projector onto the plane normal to q. Further define $\lambda(\nabla v(x,t), \nabla^2 v(x,t))$ as the smaller nonzero eigenvalue of $P_{\nabla v} \nabla^2 v \, P_{\nabla v}$. The level set evolution equation is then $$v_t = \lambda(\nabla v(x,t), \nabla^2 v(x,t)).$$

That is, this evolution is equivalent to evolving C according to $C_t = \kappa N$ in the sense that C is the zero level set of v throughout the evolution.

Figure 1:
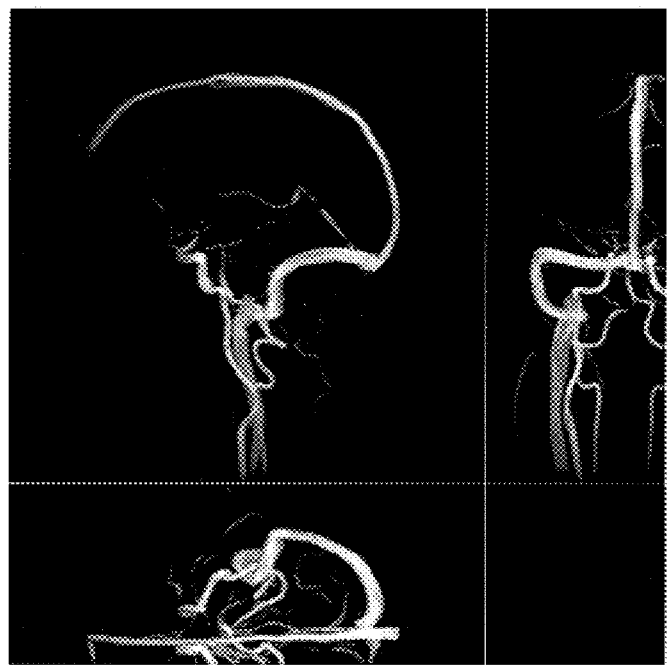
FIG. 1 is a maximum intensity projection of a phase-contrast MRA image of blood vessels in a brain.
Figure 3:
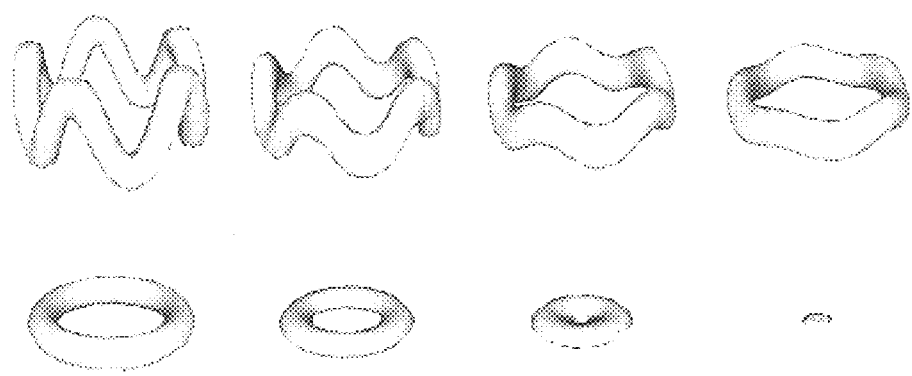
FIG. 3 illustrates a single sequence showing eight successive stages of a tubular object undergoing mean curvature flow.

FIG. 3 demonstrates this evolution by illustrating evolving curves under mean curvature flow. FIG. 3 illustrates a single sequence showing eight successive stages of a tubular object undergoing curve-shortening flow (mean curvature flow), where the curve is the centerline of the tubular shape. The bumps are first smoothed out until the shape approximates a torus, then the torus shrinks to a point.

The situation where there is an underlying vector field driving the evolution, in combination with the curvature term will now be described. Assume the desired evolution equation is of the form $$C_t = \kappa N - \Pi d$$

where $\Pi$ is the projection operator onto the normal space of C (which is a vector space of dimension 2) and d is a given vector field in $R^3$. The evolution equation for the embedding space then becomes $$v_t = \lambda(\nabla v, \nabla^2 v) + \nabla v \cdot d.$$

For the case of 1D structures in 3D images, it is desirable to minimize $$\int_0^1 g(|\nabla I(C(p))|)|C'(p)|dp$$

where $C(p):[0,1] \to R^3$ is the 1D curve, $I:[0,a] \times [0,b] \times [0,c] \to [0,\infty)$ is the image, and $g:[0,\infty) \to R^+$ is a strictly decreasing function such that $g(r) \to 0$ as $r \to \infty$. For the current implementation, $g(r)=\exp(-r)$ is used because it works well in practice. Another common choice is $g(|\nabla I|)=1/[1+|\nabla I|^2$.

Figure 4A:
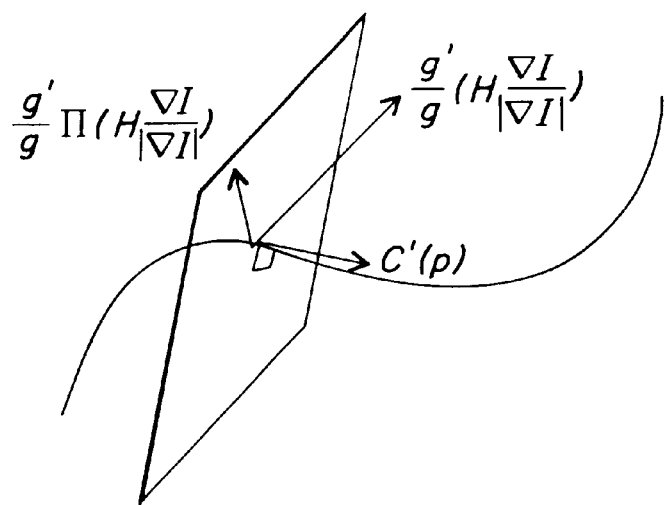
FIG. 4A shows a curve having a tangent to C at p, the normal plane, the image-based vector, and its projection onto the normal plane.
Figure 4B:
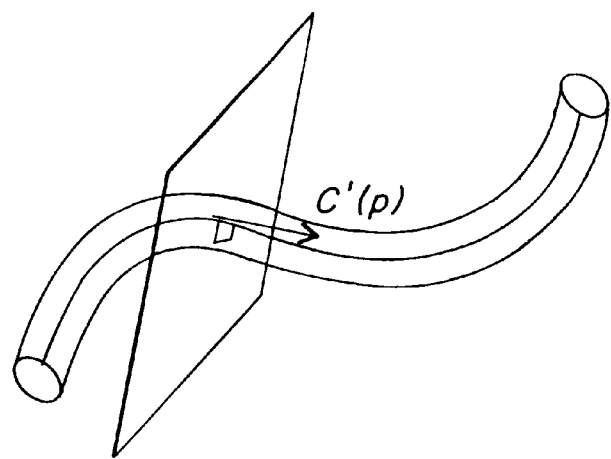
FIG. 4B shows a curve using the ϵ-level set method.

By computing the Euler-Lagrange equations, it is found that the curve evolution equation is $$C_t = \kappa N - \frac{g'}{g}\Pi\left(H\frac{\nabla I}{|\nabla I|}\right), \qquad (4)$$

where H is the Hessian of the intensity function. The second term in the above equation is illustrated in FIG. 4A, which shows a curve having a tangent to C at p, the normal plane, the image-based vector, and its projection onto the normal plane. FIG. 4B is a curve using the ε-level set method. That is, $$d = \frac{g'}{g} H \frac{\nabla I}{|\nabla I|},$$

so the equation for the embedding space is $$v_t = \lambda(\nabla v(x,t), \nabla^2 v(x,t)) + \frac{g'}{g}\nabla v(x,t) \cdot H \frac{\nabla I}{|\nabla I|}. \qquad (5)$$

Figure 5A:
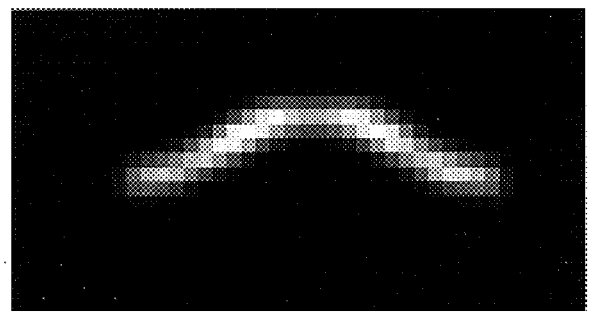
FIGS. 5A–C illustrate an evolving helix under mean curvature flow with additional vector field: target curve, initial level set, level set after evolution with endpoints constrained, respectively.
Figure 5B:
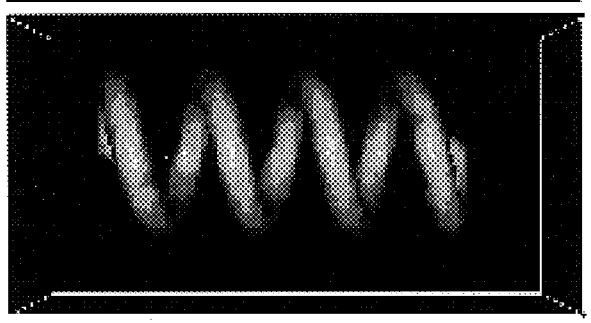
Figure 5C:
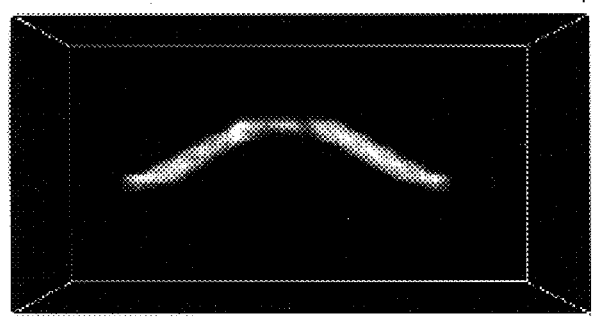

Thus, the mean curvature flow and level set methods have now been used to segment 1D structures in 3D. FIGS. 5A–C show how underlying image information can attract the evolving tube. FIGS. 5A–C illustrate an evolving helix under mean curvature flow with additional vector field: target curve, initial level set, level set after evolution with endpoints constrained, respectively. The underlying volumetric image data is shown, as a maximum intensity projection in FIG. 5A. This volume was generated by drawing a cosine curve in the volume, then smoothing with a Gaussian filter. FIG. 5B shows the initial curve, a helix. The result of the evolution is shown in FIG. 5C.

Figure 6:
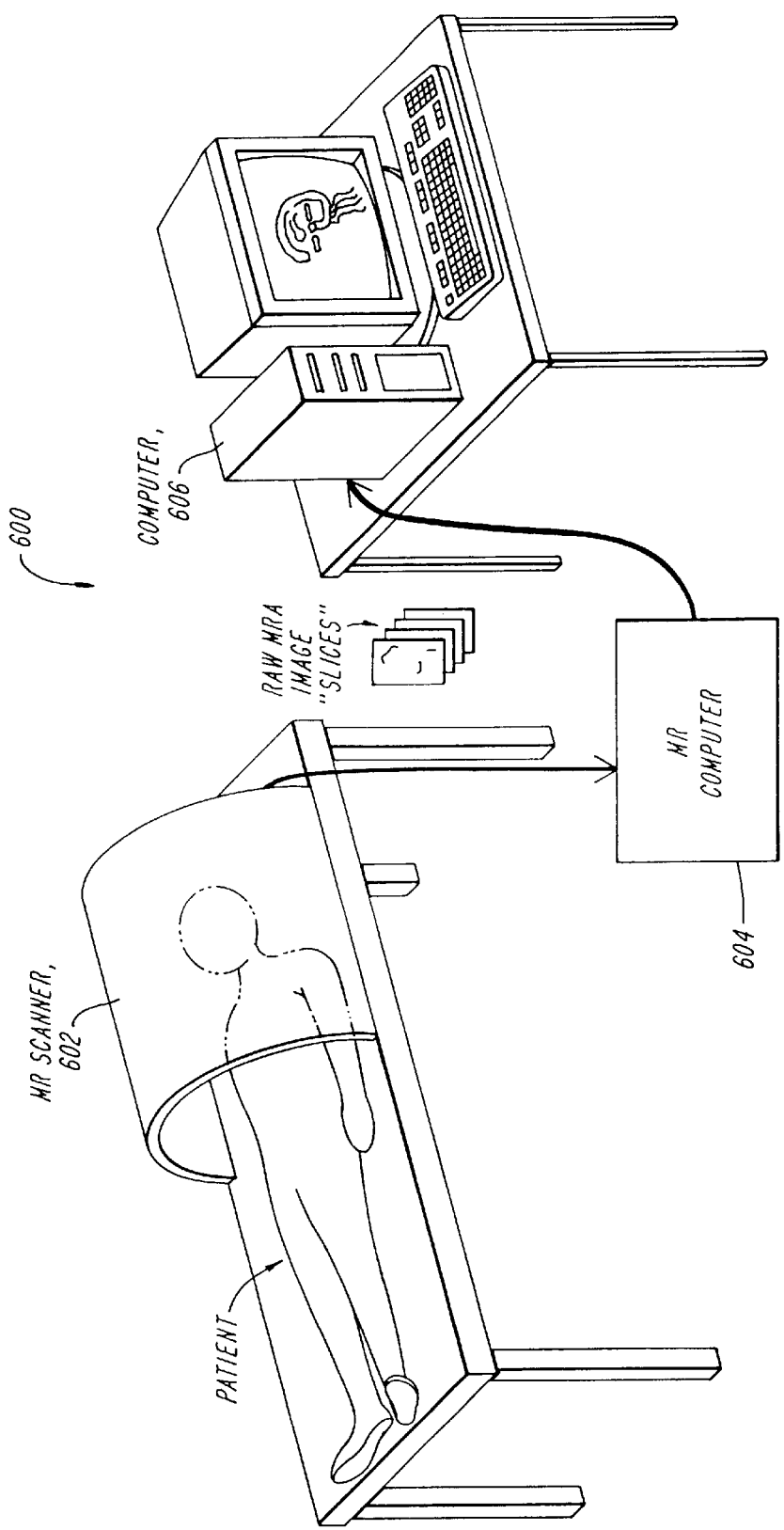
FIG. 6 is an operational block diagram of a MR segmentation system utilizing the invention.
Figure 7:
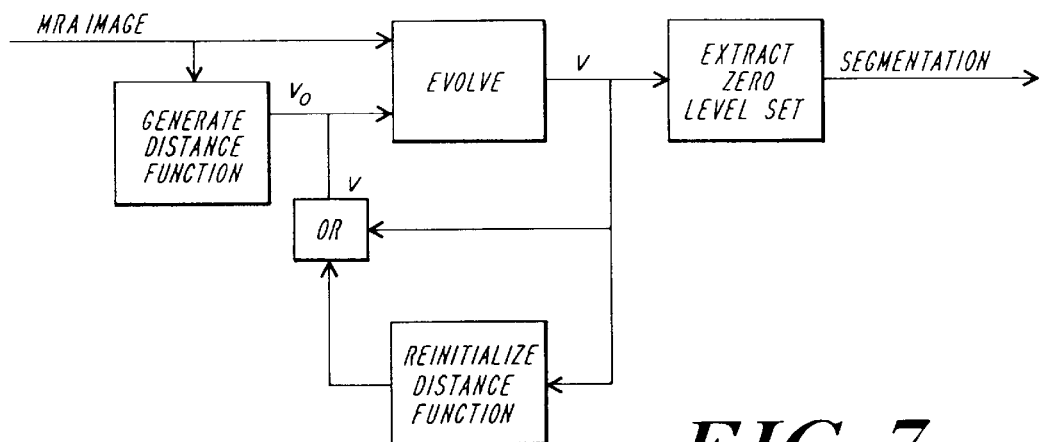
FIG. 7 is a flowchart of the segmentation algorithm in accordance with the invention.

Segmentation refers to the task of separating foreground regions of an image from background regions. The system and method for segmentation of vessels from MRA using the described level set method in accordance with the invention will now be described. FIG. 6 is an operational block diagram of a MR segmentation system 600 utilizing the invention. The system includes a conventional MR scanner 602 running in conjunction with a MR computer that generates and stores raw MRA image slices. The MR data is then segmented by a computer 606. A flowchart of the segmentation algorithm in accordance with the invention is shown in FIG. 7.

The invention produces 3D surface models of blood vessels based on magnetic resonance angiography (MRA) data. A scenario in which one could use the invention is illustrated in FIG. 6. Consider a patient who is suspected to have abnormalities in blood vessels in the brain, such as an aneuryism or other. Or perhaps one would like to view the blood vessels for study purposes.

The patient's head is imaged in a magnetic resonance scanner 602. The image produced is a three-dimensional image. This means that it is actually a stack of many (often 60) two-dimensional images, each of which pictures a "slice" or cross-section of the anatomical region imaged and stored by MR computer 604. In this example, the head is this region.

The invention utilizes a computer 606 to generate a 3D surface model of the blood vessels in the head, based on this 3D image. This surface model could be displayed and manipulated on a standard computer. The surface model can be viewed by clinicians, radiologists, and other persons. The surface model is often preferable to the raw 3D image in the areas of ease of interpretation, ease of further measurements, incorporation with other anatomical information, and other areas.

Blood vessels appear in MRA images as bright curve-like patterns that may be noisy and have gaps. The data is a stack of slices where most areas are dark, but vessels tend to be bright. This stack is collapsed into a single image for viewing by performing a projection through the stack that assigns to each pixel in the projection the brightest voxel over all slices.

The task of MRA segmentation is complicated by the presence of imaging artifacts which appear visually similar to true vessel structures and also to partial voluming, the case of a small imaging area having a brightness value that is a combination of the brightness values of vessels and of background because the vessel is only partially inside the area imaged.

This specific segmentation problem is part of the high-level problem of developing computerized techniques for the analysis of medical images. Automatic and semi-automatic techniques can potentially assist clinicians and radiologists, saving them much of the time required to manually segment large datasets, or more generally facilitating measurements and interpretation of the images.

The ε-level set method is now described. Since the projection operator $P_q$ is defined only for non-zero vectors q, the method is undefined at $\nabla v = 0$, which is the curve itself, and is numerically unstable near the curve. For this reason, v is regarded as a distance function to a "tube" of small radius ε around the curve, instead of extracting the true 1D curve. That is, ε-level set is evolved instead of evolving the true curve as shown in FIG. 4B. It will be appreciated that ε does not denote a fixed value here. The evolving shape is a "tubular" surface of some (unspecified and variable) nonzero width. In addition to being more robust, this method better captures the geometry of blood vessels, which have nonzero diameter.

Banding will now be described. Instead of evolving the entire volume, only the portion of the volume within a narrow band of the zero level set is evolved (the current surface). Normally, the band is set to include voxels that are up to 6 voxels away from the surface. The advantage of this technique is efficiency, and the disadvantage is that structures that are outside the band may be missed if the potential function g does not have a large enough capture range to attract the segmentation to these structures. The interpretation of banding is different from that in previous level set methods; they propagate image information from the zero level set to the rest of the bands, while the invention uses image information at each point.

A description of the use of curvature instead of eigenvalues is now provided. For computational efficiency and because of numerical instability of the gradient computations and thus the evolution equation near $\nabla v = 0$, the level sets of the function v flow in the direction of the normal with velocity equal to the sum of their smaller principal curvature and the dot product of $\nabla v$ with the image-based vector field d. Therefore, the smaller curvature is computed directly from v instead of as an eigenvalue of $P_{\nabla v} \nabla^2 v \, P_{\nabla v}$, and the invention uses $\lambda = |\nabla v| P_2$, where $P_2$ is the smaller curvature.

Figure 8:
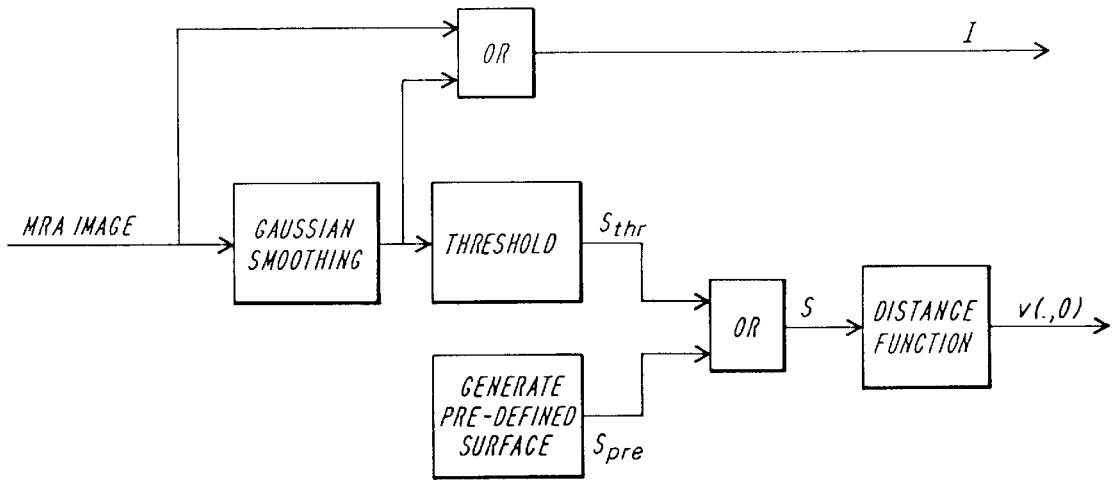
FIG. 8 is a flowchart showing the details of the surface and volume initialization portion of the algorithm in accordance with the invention.
Figure 9A:
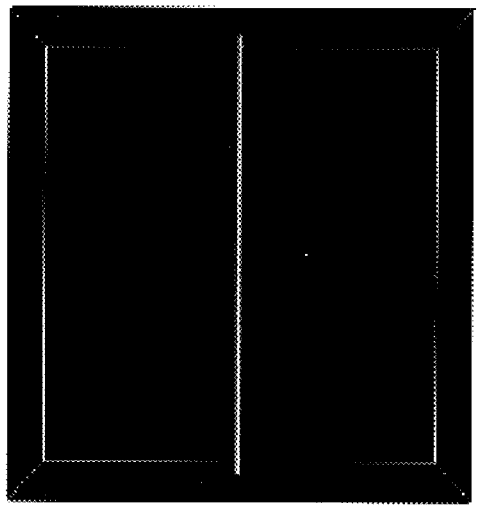
FIGS. 9A–D illustrate a vertical bar evolving into a segmentation of a first dataset.
Figure 9B:
Figure 9C:
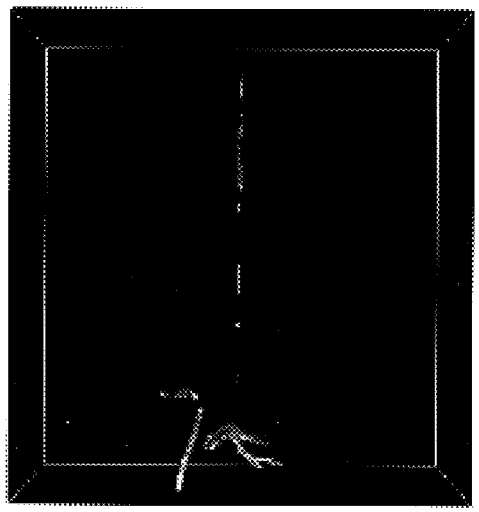
Figure 9D:
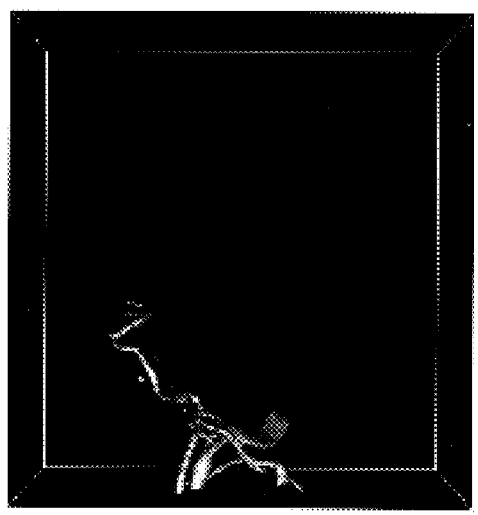

With reference now to FIGS. 7 and 8, the algorithm used in the method of the invention is described.

Initially, the 3D MRA volume is loaded into the computer. The vessels appear bright, background appears dark. An initial surface S is generated either by thresholding the inputted data set or by using a previously generated surface. A signed distance function to S is then generated. This distance function is a 3D volume, v. The volume v is a function of spatial location x. Since it will be repeatedly updated over time, it can also be considered a function of time. That is, v=v(x,t) and S is the zero level set of v(·,0). The detailed flowchart of the surface and volume initialization is shown in FIG. 8.

v is a function defined on a volume. Additionally, v changes with time. That is, v is a function of both spatial location and time, so v=v(x,y,z,t). For conciseness and also to emphasize that there are intuitively only two arguments (location and time), (x,y,z) is abbreviated with simply x. So, v=v(x,t), where x now and henceforth indicates the full triple of spatial coordinates.

Let S be some surface inside a volume having an interior and exterior that is well-defined. For intuition, picture S as a closed tube or ball. Presume that S can evolve (move, grow, shrink, stretch, deform) over time. Let $S_t$ denote the surface at time t. The specific function v used in this work is the signed distance function to S. That is, v(x,t) is the signed distance from x to the nearest point p on $S_t$. Signed distance is the usual geometric distance multiplied by −1 if x is inside the surface, else by 1.

The notation v(·,t) is used to indicate the entire volume at time t. That is, the "·" indicates all possible values of the first argument x. Whereas v(x,t) is a single numeric value, v(·,t) is the volume obtained by computing v(x,t) for all x's. This volume can be considered a function whose input is a spatial location and whose output is some number: in this case that number is the signed distance to $S_t$.

A level set of a function is the set of all arguments whose function value is the same constant. The zero level set of a function is the set of all arguments whose function value is zero. By definition, the surface $S_t$ is exactly the set of all points whose (signed or unsigned) distance to $S_t$ is zero. So, $S_t$ is the zero level set of v(·,t).

Start with an initial surface, S (=$S_0$) and from it construct the volume v(.,0). That is, at each spatial location x, the signed distance to S is calculated. That distance is the numeric value v(x,t). Thus, by definition, S is the zero level set of v(·,0).

The method continues by iteratively updating v according to Equation 5. The algorithm may also incorporate the image scaling term previously described and/or an orientation term. The process terminates at convergence or as determined by the user.

S is redefined periodically or when needed, to be the zero level set of the current distance function v' and reinitialize v' to be the distance function to S'. The process continues by updating the volume according to the previous step.

The loop above yields a final distance function v. The first output obtained from this volume is a segmentation of the blood vessels, obtained by computing the zero level set of v. Second, the centerlines are obtained as the local minima of the distance function. Third, estimates of vessel diameter are obtained as a by-product of the computation of λ in Equation 5.

To control the trade-off between fitting the surface to the image data and enforcing the smoothness constraint on the surface, an image scaling term imscale is added to Equation 5 to obtain $$v_t = \lambda(\nabla v(x,t), \nabla^2 v(x,t)) + imscale * \frac{g'}{g} \nabla v(x,t) \cdot H \frac{\nabla I}{|\nabla I|} \quad (6)$$

imscale being set by the user or pre-set to a default value.

With respect to gradient directionality, because vessels appear brighter than the background, the image term is weighted by the cosine of the angle between the normal to the surface and the gradient in the image. This cosine is given by the dot product of the respective gradients of v and I, so the update equation becomes $$v_t = \lambda(\nabla v(x,t), \nabla^2 v(x,t)) - imscale * (\nabla v \cdot \nabla I) * \frac{g'}{g} \nabla v(x,t) \cdot H \frac{\nabla I}{|\nabla I|}. \quad (7)$$

For example, if the two vectors point in the same direction, then the brighter region is inside the surface and the darker region is outside. The angle between the vectors is 0, whose cosine is 1, so the image term is fully counted. However, if they point in opposite directions, the negative weighting prevents the evolving vessel walls from being attracted to image gradients that point in the opposite direction.

As customary in level set segmentation methods, the volume v is periodically reinitialized to be a distance function. The zero level set S is extracted, then each point in the volume is set to be its distance to S. For the implementation of the invention, this reinitialization is itself a level set method. To obtain the positive distances, the surface is propagated outward at constant speed of 1, and the distance at each point is determined to be the time at which the surface crossed that point. A second step propagates the surface inward to obtain the negative distances analogously.

With respect to the initial surface, FIG. 8 shows a flowchart of a more detailed portion of the algorithm used to generate the initial surface. This initial surface (and thus the initial volume) is normally generated by thresholding the MRA dataset. However, the method does not require that the initial surface be near the target surface but may use any initial surface. FIGS. 9A–D illustrate a vertical bar evolving into the segmentation of the first dataset in FIG. 11.

As shown in FIG. 8, the datasets may be pre-processed to reduce noise and smooth. For the results presented here, the raw datasets were convolved with an isotropic Gaussian of σ=0.5.

The segmentations are post-processed to remove any surface patches whose surface area is less than some threshold (a parameter of the method) to eliminate patches corresponding to noise in the original data.

With respect to vessel radii estimation, the larger principal curvature can be useful in measuring the radii of the vessels for a particular application, since radius is the inverse of curvature. This curvature can be easily computed when the smaller principal curvature is computed for the segmentation. The option to color-code the segmentations can be added based on vessel radii, as estimated from the local larger principal curvature of the tubular surface.

Figure 10:
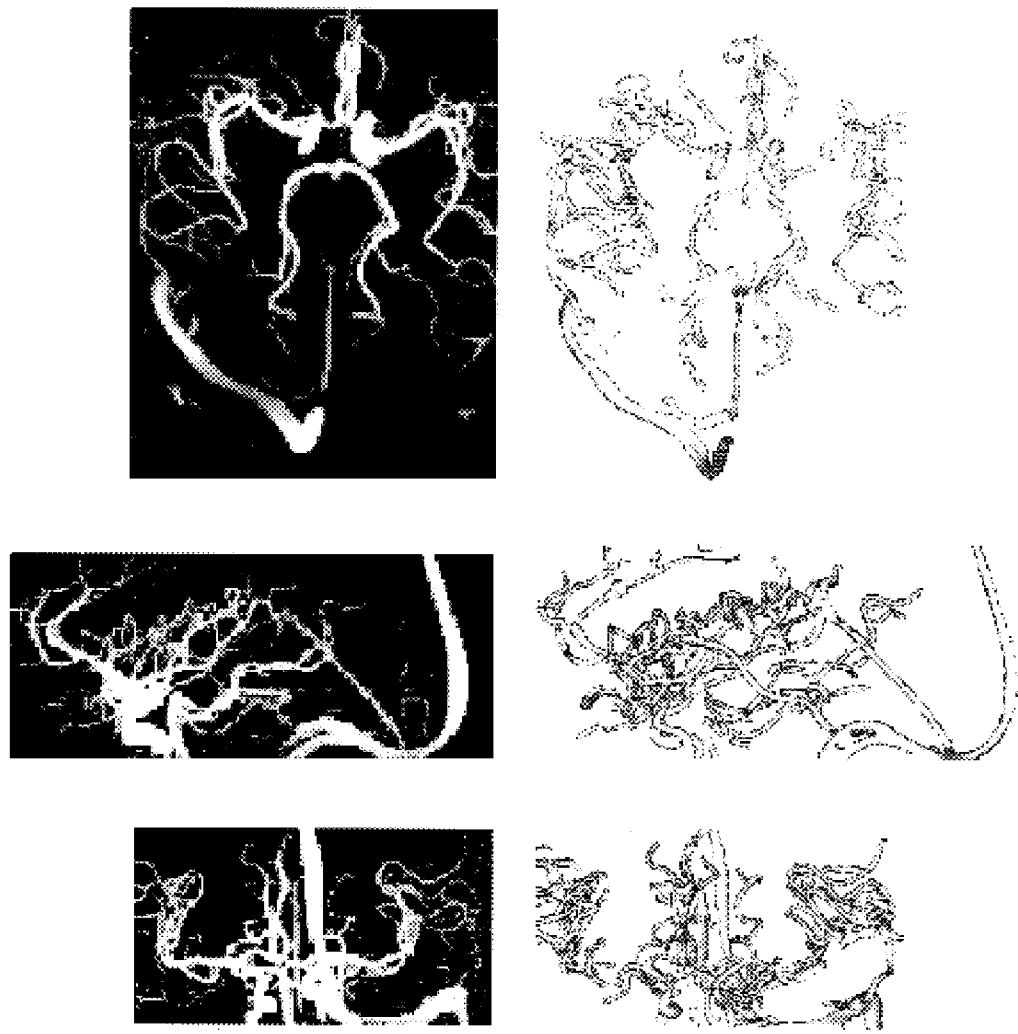
FIG. 10 is a single 3D dataset, the first image in each row is the maximum intensity projection of the raw data, and the second image is the segmentation result from three orthogonal viewpoints.

The results of the segmentation on four datasets in accordance with the invention are demonstrated in FIG. 10. FIG. 10 is a single 3D dataset, the first image in each row is the maximum intensity projection of the raw data, and the second image is the segmentation result from three orthogonal viewpoints.

The following parameters were used in these experiments. All settings were chosen empirically. For the method, imscale varied across the datasets depending on the noise present. A cleaning threshold c indicated the minimum surface area of connected components of the surface to be retained in the post-processing cleaning step.

FIG. 10 shows a single 3D data set (in maximum intensity projection) and segmentation result from three orthogonal viewpoints. The result shown is obtained by thresholding the raw data set.

Figure 11:
FIG. 11 illustrates an image of a partial segmentation of the first dataset in FIG. 10, the colorscale is continuous from darkest to lightest intensities, with darkest indicating a radius of curvature $\leq 1$ mm and lightest indicating a radius of curvature $\geq 2$ mm.

Finally, the capability to color-code the vasculature surface is demonstrated based on local curvature. With reference to FIG. 11, it will be appreciated that for a ribbon-like vessel, the flatter sides shows a large radius, and the sharply curved edges show a small radius. In this image of a partial segmentation of the first dataset in FIG. 10, the colorscale is continuous from darkest to lightest intensities, with darkest indicating a radius of curvature≦1 mm and lightest indicating a radius of curvature≧2 mm. The curvatures output by the evolution have been smoothed by a 3×3×3 filter prior to coloring the surface.

Although the present invention has been shown and described with respect to several preferred embodiments thereof, various changes, omissions and additions to the form and detail thereof, may be made therein, without departing from the spirit and scope of the invention.

What is claimed is:

1. A method of providing segmentation of volumetric three-dimensional image data set comprising:
   (a) inputting a volume of said volumetric three-dimensional image data set;
   (b) generating an initial surface S by thresholding said input volume;
   (c) generating a signed distance function v to S, where v=v(x,t) and S is the zero level set of v(·,0);
   (d) iteratively updating v according to $$v_t = \lambda(\nabla v(x, t), \nabla^2 v(x, t)) + \frac{g'}{g}\nabla v(x, t) \cdot H\frac{\nabla I}{|\nabla I|},$$

said updating terminates at convergence or as determined by an operator, wherein the function g can be any function such that g:[0,∞)→R$^+$ is strictly decreasing and g(r)→0 as r→∞;
   (e) defining S' to be the zero level set of the current distance function v' and reinitialize v' to be a distance function to S'; and
   (f) continuing updating the volume according to step (d) such that a final distance function v is obtained, wherein
      the first output obtained from said volume is a segmentation of vessels in the three-dimensional image data set, obtained by computing the zero level set of v.

2. The method of claim 1, wherein an image scaling term imscale is added to the equation of step (d) so that $$v_t = \lambda(\nabla v(x, t), \nabla^2 v(x, t)) + imscale * \frac{g'}{g}\nabla v(x, t) \cdot H\frac{\nabla I}{|\nabla I|}.$$

3. The method of claim 2, wherein an orientation term costerm=−∇v·∇I, so that $$v_t = \lambda(\nabla v(x, t), \nabla^2 v(x, t)) - imscale * (\nabla v \cdot \nabla I) * \frac{g'}{g}\nabla v(x, t) \cdot H\frac{\nabla I}{|\nabla I|}.$$

4. The method of claim 3 further comprising varying the frequency of reinitializing v to be the signed distance function to its zero level set.

5. The method of claim 4, wherein any distance function algorithm can be used to reinitialize v during the reinitialization step.

6. The method of claim 5 wherein a predefined shape with a predefined distance function is chosen instead of thresholding the volumetric three-dimensional image data set.

7. The method of claim 6 further comprising extracting the centerlines of the segmented volumetric three-dimensional image data set, said extraction is performed by:
   extracting the set of points that are inside the segmented surface and that are also local minima of the distance function v; and
   defining the hierarchical shortest path.

8. The method of claim 7, wherein said step of defining the hierarchical shortest path comprises:
   (a) defining the set of primary nodes of a graph to be the extracted local minima and also secondary nodes to be the other voxels inside the vessels of the volumetric three-dimensional image data set; and
   (b) connecting nodes that are adjacent in the three-dimensional volume with the Euclidean distance between the nodes;
   (c) finding, for each primary node, the shortest path to another primary node;
   (d) combining connected paths into a single primary node and again finding the shortest path to another primary node; and
   (e) repeating steps (a)–(d) until entire structure is connected or no more connections are possible within the given segmentation.

9. The method of claim 8 further comprising removing from the segmented surface any surface patches whose area or volume is beneath a predetermined threshold.

10. The method of claim 7 further comprising removing from the segmented surface any surface patches whose area or volume is beneath a predetermined threshold prior to extraction of the centerlines.

11. The method of claim 6 further comprising inferring local diameter information about the vessels of the volumetric three-dimensional image data set, said information being visualized by coloring the segmented surface according to local diameter, said diameter information being obtained directly in the algorithm since it is the inverse of the larger principal curvature of the surface and this curvature is found during the computation of λ in the update rule for v.

12. The method of claim 6 further comprising removing from the segmented surface any surface patches whose area or volume is beneath a predetermined threshold.

13. The method of claim 1, wherein said volumetric three-dimensional image data set comprises MRA data.

14. A system of providing segmentation of volumetric three-dimensional image data set comprising:
   (a) means for inputting a volume of said volumetric three-dimensional image data set;
   (b) means for generating an initial surface S by thresholding said input volume;
   (c) means for generating a signed distance function v to S, where v=v(x,t) and S is the zero level set of v(·,0);
   (d) means for iteratively updating v according to $$v_t = \lambda(\nabla v(x, t), \nabla^2 v(x, t)) + \frac{g'}{g}\nabla v(x, t) \cdot H\frac{\nabla I}{|\nabla I|},$$

said updating terminates at convergence or as determined by an operator;
   (e) means for defining S' to be the zero level set of the current distance function v' and reinitialize v' to be a distance function to S'; and
   (f) means for continuing updating the volume according to (d) such that a final distance function v is obtained, wherein
      the first output obtained from said volume is a segmentation of vessels in the three-dimensional image data set, obtained by computing the zero level set of v.

* * * * *